United States Patent Office 2,693,680
Patented Nov. 9, 1954

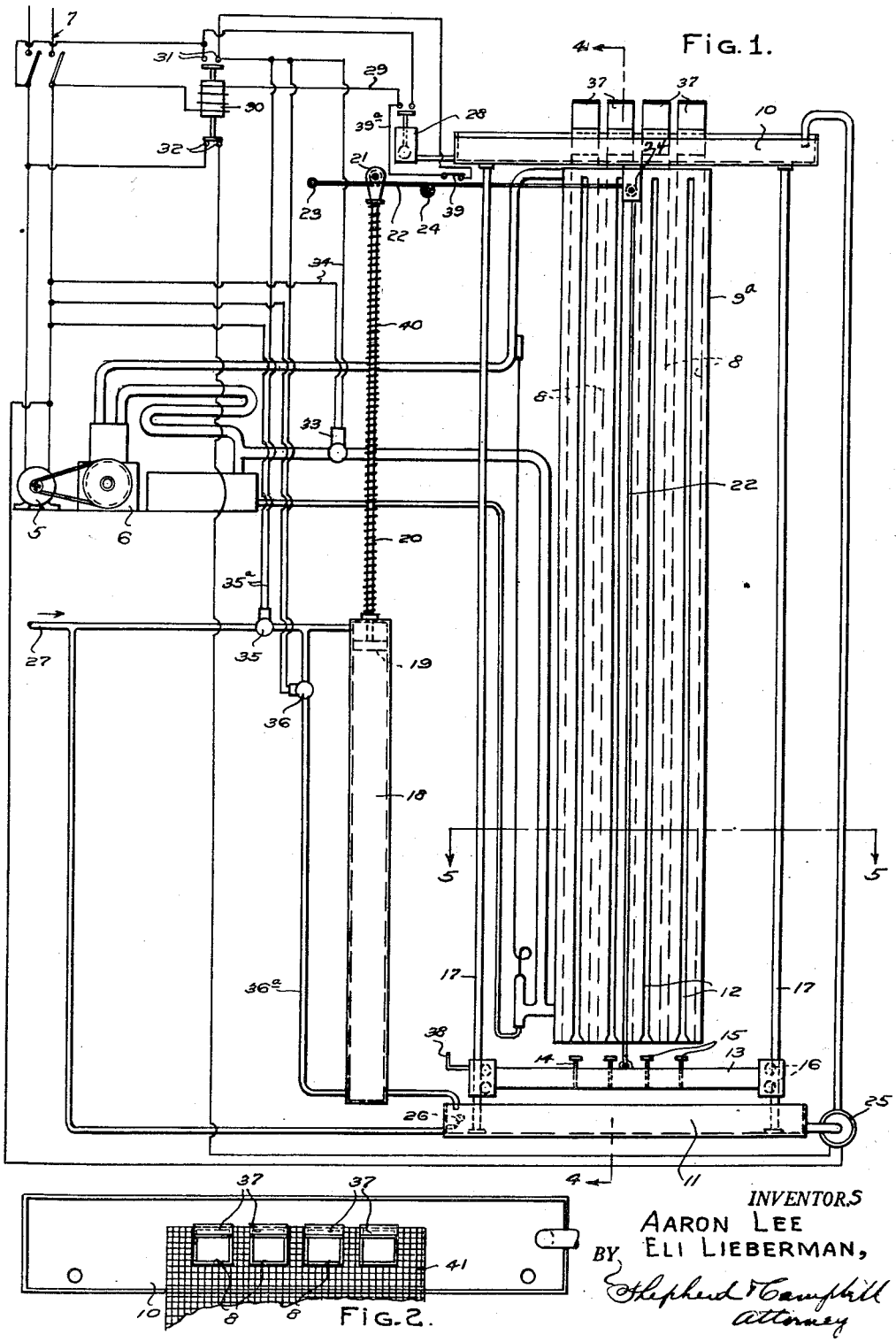

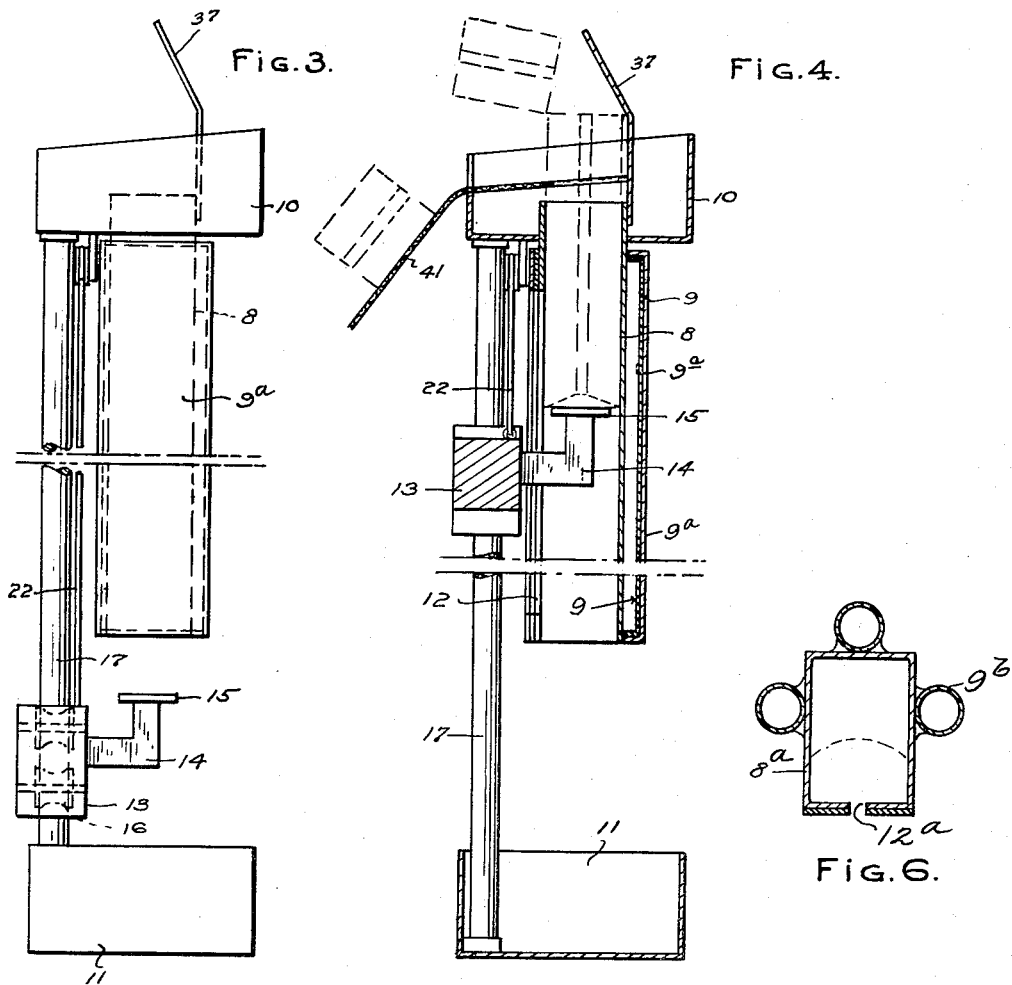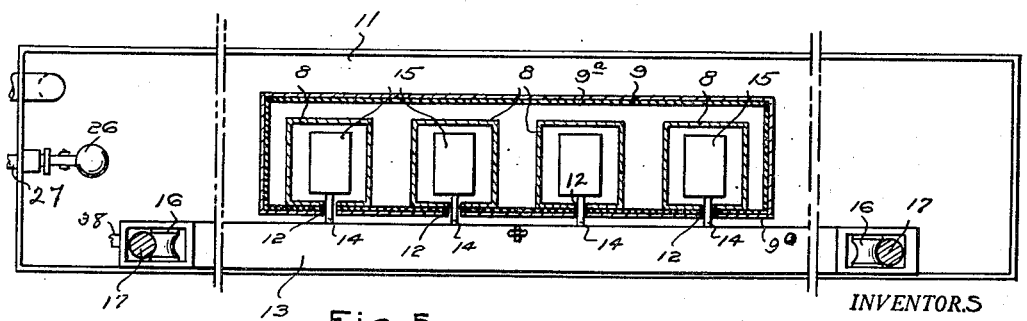

2,693,680

MEANS FOR MAKING ICE CUBES

Aaron Lee and Eli Lieberman, Miami, Fla.; said Lieberman assignor to said Lee

Application February 1, 1952, Serial No. 269,435

4 Claims. (Cl. 62—7)

This invention relates to an improved method of an apparatus for freezing ice and delivering the same in the form of ice cubes or other small masses of ice.

Among the objects of the invention is to provide means whereby the shift from the freezing to the defrosting cycle of an ice cube making machine, is effected under control of the physical condition, that is, the actual degree of freezing of the ice column, rather than under control of temperature affected thermostats, or the like.

Another object of the invention is to freeze the ice columns or rods in much longer masses than has heretofore been the practice. By thus freezing the ice in longer rods or columns, we are able, with a relatively few freezing tubes, to equal the capacity of machines employing a much larger number of tubes. What is equally important is that we thereby materially reduce the number of ends of the ice rods, which ends, by reason of imperfect freezing at the ends of the rods, are poorly formed and looked upon as more or less waste product.

A still further object of thus freezing the ice rods in long masses is that the full height of the cabinets, in which these assemblies are ordinarily mounted, is utilized.

The invention further embodies means for maintaining water circulation through the ice columns right up to the completion of the freezing cycle, whereby air bubbles and other imperfections in the formed ice, are avoided. The invention contemplates the provision of a freezing system and apparatus wherein the production of ice cubes, crushed ice or other small ice masses, may be automatically and continuously carried out through any desired length of time, and wherein the alternate thawing and freezing cycles may be caused to occur rapidly and with a high degree of efficiency.

Other objects and advantages of the invention will be best understood by reference to the accompanying drawings, which illustrate one embodiment of the invention.

In the drawings:

Figure 1 is a diagrammatic view of our system, illustrating a bank of freezing tubes and the associated parts, in front elevation, Figure 2 is a plan view of the upper water tank, Figure 3 is an end elevation, Figure 4 is a vertical section on line 4—4 of Figure 1, Figure 5 is a horizontal section on line 5—5 of Figure 1 and Figure 6 is a horizontal section of a modified form of freezing tube.

Like numerals designate corresponding parts in all of the figures of the drawings.

In the drawings 5 and 6 designate, respectively, the motor and compressor of a conventional refrigerating system. When the main line switch 7 is closed the system is set in operation to go through repeated cycles of freezing and thawing or defrost, during which ice cubes are produced and which production of ice cubes continues as long as the system is kept in operation; that is, until the motor 5 is stopped.

In carrying out the invention we provide a battery of freezing tubes 8 of much greater length than has heretofore been the practice in small ice cube making machines, and we enclose the vertical walls of said tubes in a circulating chamber 9, through which a refrigerant and hot gases are alternately passed, to thereby subject tubes 8 to alternating freezing and thawing cycles. The upper ends of tubes 8 project into and a short distance above the bottom of a water pan 10, while the open lower ends of tubes 8 terminate a short distance above the top of a lower water pan 11. Each freezing tube has a vertical slot 12 formed in its side, which extends from the bottom of the tube to a short distance below pan 10. An ejector carriage 13 carries a plurality of ejectors which consist of narrow flat portions 14 which travel in slots 12 and plate-like heads 15, of such amplitude as to securely engage beneath the lower ends of the ice rods or columns to impart a firm, upward, ejecting thrust to said rods. The ejector carriage is provided with rollers 16, which engage and are guided upon rigid guide rods 17. While many ways will readily suggest themselves to those skilled in the art for imparting upward movement to the ejector carriage, one simple and effective way resides in the provision of a hydraulic cylinder 18 and piston 19. When water or other pressure fluid is admitted to the upper end of cylinder 18, piston 19 and its rod 20 are thrust downwards. The upper end of the piston rod carries a grooved pulley 21. This pulley engages a cable 22, one end of which is secured to a fixed point at 23 and the other end of which engages the ejector carriage, after passing over guide pulleys 24. Thus it will be seen that the piston rod does not draw upon an end of the cable, but that it draws upon a bight portion of the cable and that consequently the movement of the ejector carriage will be approximately twice that of the piston rod.

An electrically actuated water pump 25 circulates water from lower pan 11 to the upper water pan 10. A float valve 26 controls the water supply from supply pipe 27 to pan 11. A float controlled switch 28 is constructed to close a circuit 29 when water in the upper pan rises above a predetermined degree. When this happens and circuit 29 is closed, a relay 30 is energized to close upper contacts 31 and to break its lower contacts 32. As long as lower contacts 32 are closed, a circuit is completed to the water pump and water is being circulated from the lower pan to the upper pan. This water overflows the tops of the freezing tubes and flows down the inner sides thereof, freezing from the outside, toward the centers of the ice rods or columns. At the initial stage of the freezing cycle, some water leaks out of the slots 12, but this is of small importance, since it falls into the lower pan and is recirculated. Soon the slots are frozen over and then the freezing proceeds as though said slots were not present. When the physical condition of the ice rods has brought about such constriction of the remaining openings through the rods, that the escape of water from the upper pan is retarded, the resultant rise of the water level in the pan causes float controlled switch 28, previously open, to close its circuit 29 and energize the relay 30. This results in contacts 31 being connected and the system goes into the defrost or thawing cycle. At the making of contacts 31, contacts 32 are broken and the water circulating pump stops. A hot gas solenoid controlled valve 33 is opened by energization of circuit 34 and hot gas from the refrigerating system enters the circulating chamber 9 and acts upon the freezing tubes to exert such a thawing action as to thaw the exterior surfaces of the ice rods loose from the freezing tubes.

An electrically opened solenoid actuated valve 35 in the water supply line and disposed in circuit 35$^a$ is opened to supply water to the upper end of hydraulic cylinder 18. At the same time a solenoid actuated drain valve 36, disposed in a drain or exhaust line 36$^a$, is closed. This drain line leads first to the lower part of the hydraulic cylinder and thence to the lower water pan. The supply of pressure fluid to the hydraulic cylinder acts, as described, to forcibly thrust the ejector carriage upwardly and to thereby eject the whole length of the ice rods from the upper ends of the freezing tubes. In this forcible ejection, the rods are broken into a large number of cubes by being thrust against overhanging oblique plates 37, secured at the mouths of the tubes.

The invention is not limited to any particular character of ice shattering or breaking elements, such as the plates 37. Any suitably shaped abutments may be employed to break the ice into cubes or into crushed ice, and we wish it to be understood that the novel features of the invention, as recited in the claims, are not affected by the particular nature of the ice breaking means employed. However, it will be noted that our freezing tubes are shown as being substantially square in cross section and this, in conjunction with the "snap off" oblique plates, yields ice bodies of cube formation with which the public is familiar and which the public seems to prefer. However, we may use round tubes or tubes of any other shape in carrying out the invention. The circulating chamber 9 is covered with insulating material 9a, and the front faces of the freezing tubes are also covered with insulating material 9c, the latter insulating material acting to prevent freezing of the water which leaks from the slots, upon the faces of the tubes. At the beginning of the upward movement, the ejector carriage will hang momentarily until all of the ice rods have been thawed loose. Then when the carriage moves upwardly, all of the ice will be ejected, because the heads 15 of the ejectors project far enough above their shanks or flat portions 14 to cause the heads to travel practically all the way up the freezing tubes.

When the ejector carriage has completed its upward travel, an arm 38 thereon strikes and opens a "hold on" shunt switch 39. This switch is disposed in a shunt circuit 39a, the function of which is to keep the energizing circuit 29 of relay 30 closed, even after the float controlled switch 28 opens. After the pump stops and water leaks down the centers of the ice rods or columns, the lowering of the water level in the upper water pan will cause the float switch to open, but this does not deenergize the relay which remains energized until the shunt switch is opened by the completion of the upward travel of the ejector carriage. When that happens, the system goes back into the freezing cycle. The water supply to the hydraulic cylinder is cut off by the closing of water valve 35, while the drain valve 36 opens to permit water to exhaust, first to the lower portion of the hydraulic cylinder and thereafter to the lower pan, as stated. The ejector carriage descends under the influence of gravity and to relieve this carriage of the drag of the piston in returning to the top of the hydraulic cylinder, we may assist such upward movement of the piston by the provision of a compression spring 40, which encircles the piston rod. The ice cubes snapped off by the oblique plates 37 are discharged upon a screen or like chute element 41 by which they are delivered to a suitable bin, not shown.

In Figure 6 we have illustrated a freezing tube 8a having a slot 12a in its front wall which slot serves the purpose of slots 12 hereinbefore described. In this case the tube is elongated in horizontal cross section and freezing and thawing tubes for conducting refrigerant and hot gases, as described, are indicated at 9b. The purpose of this is to cause the water fed into the tube to freeze more rapidly at the rear portion of the tube than at the front thereof. Consequently, the ice builds up gradually toward the slot, and a solid column of ice is formed, without a central open core.

The invention is not limited to the precise construction described, but includes within its purview whatever changes fairly fall within either the terms or the spirit of the appended claims.

Having described our invention, we claim:

1. In an ice cube making machine a battery of vertical open ended water receiving freezing tubes, a passage about said freezing tubes, means for supplying and alternately conducting freezing and thawing fluids through said passage to thereby alternately subject the freezing tubes to freezing and thawing cycles, an upper water pan into which the upper ends of said tubes enter, a lower water pan disposed below said tubes, means for maintaining a determined water level in the lower pan, a circulating pump which circulates water from the lower to the upper pan, a water level controlled switch, means for conducting water from the upper pan to the said switch, to actuate the same when freezing of the water in the tubes retards circulation of the water enough to cause a predetermined rise of the water level in the said pan, a relay circuit controlled by said switch, a relay therein, an electric circuit controlled by said relay, an ejector carriage, means for guiding said ejector carriage to travel in a plane parallel to said tubes, ejectors carried by the carriage and mounted to travel in said tubes to eject the ice columns from the upper ends thereof, breaking means at the upper ends of the tubes against which the ice is broken under the influence of the upward thrust of the ejectors, actuating means for imparting upward travel to the ejector carriage, a control member for the actuating means, said control member in turn being controlled by said relay, and means carried by the carriage for interrupting the circuit to the relay upon completion of the upward travel of the said carriage.

2. In an ice cube making machine, a plurality of vertical water receiving and retaining freezing tubes, each having an elongated slot in its wall, means for feeding water to be frozen into ice columns into the upper ends of said tubes, an ejector for each tube comprising a portion operable in the slot of its tube, a common ejector carriage by which all of the ejectors are carried and actuating mechanism for the said carriage, said actuating mechanism of the carriage including a hydraulic cylinder and piston, valvular means for controlling the supply of pressure fluid to the hydraulic cylinder and means for actuating the said valvular means by the retardation of water flow through said vertical tubes when the freezing of ice in the tubes reaches a predetermined degree.

3. In an ice cube making machine, a plurality of vertical freezing tubes, an upper water pan into which the upper ends of said tubes projects, a lower water pan disposed below the said freezing tubes, means for circulating water from the lower pan to the upper pan and back through the freezing tubes, each of said tubes having an elongated narrow slot formed in its wall extending substantially throughout the length of the tube, through which water escapes until said slot is closed by the progress of freezing of the ice columns, an ejector for each tube comprising a thin shank traveling in the slot of its tube, and a head inwardly of said slot dimensioned to engage beneath the frozen column of ice in said tube, and to thrust thereagainst, an ejector carriage to which the ejectors are secured, guide means for guiding the carriage in a plane parallel with the outer faces of the tubes, and an actuating mechanism for moving the said carriage forcibly upward to cause the ejectors to thrust the frozen columns of ice out of the upper ends of said tubes, said actuating mechanism of the carriage comprising a hydraulic cylinder, piston, and piston rod, a cable attached at one end to the carriage and at its other end to a fixed point, and means carried by the piston rod and engaging a bight portion of the cable, whereby to move the carriage substantially twice the distance moved by the piston.

4. In an ice cube making machine a battery of vertical water receiving freezing tubes, a passage about said freezing tubes, means for supplying and alternately conducting freezing and thawing fluids through said passage to thereby alternately subject the freezing tubes to freezing and thawing cycles, an upper water pan into which the upper ends of said tubes enter, a lower water pan disposed below said tubes, means for maintaining a determined water level in the lower pan, a circulating pump which circulates water from the lower to the upper pan and through said tubes, a water level controlled switch, means for conducting water from the upper pan to the said switch, to actuate the same when freezing of the water in the tubes retards circulation of the water enough to cause a predetermined rise of the water level in the said pan, a relay circuit controlled by said switch, a relay therein, an electric circuit controlled by said switch, an ejector carriage, means for guiding said ejector carriage to travel in a plane parallel to said tubes, ejectors carried by the carriage and mounted to travel in said tubes to eject the ice columns from the upper ends thereof, breaking means at the upper ends of the tubes against which the ice is broken under the influence of the upward thrust of the ejectors, actuating means for imparting upward travel to the ejectors, a control member for the actuating means, said control member in turn being controlled by said relay, and means carried by the carriage for interrupting the circuit to the relay upon completion of the upward travel of the said carriage, said actuating means of the ejector carriage comprising a hydraulic cylinder and piston, and a pressure water supply line, and wherein the said control member consists of an electrically actuated valve in the water supply line which valve is controlled by the said relay.

References Cited in the file of this patent

UNITED STATES PATENTS

| Number | Name | Date |
|---|---|---|
| 861,184 | Jaeger | July 23, 1907 |

(Other references on following page)

UNITED STATES PATENTS

| Number | Name | Date |
|---|---|---|
| 1,623,947 | Frick | Apr. 5, 1927 |
| 2,145,773 | Muffly | Jan. 31, 1939 |
| 2,198,168 | Harris | Apr. 23, 1940 |
| 2,479,396 | Nelson | Aug. 16, 1949 |
| 2,522,651 | Van Vleck | Sept. 19, 1950 |
| 2,549,747 | Leeson | Apr. 17, 1951 |
| 2,593,874 | Grandia | Apr. 22, 1952 |
| 2,598,430 | Pownall | May 27, 1952 |
| 2,637,177 | Reedall | May 5, 1953 |
| 2,639,594 | Watt | May 26, 1953 |